United States Patent [19]

Liedloff

[11] Patent Number: 4,689,393
[45] Date of Patent: Aug. 25, 1987

[54] PREPARATION OF BLOCK POLYETHERESTER AMIDE FROM CARBOXY TERMINATED POLYAMIDE AND DIHYDROXY POLYETHER WITH TIN COMPOUND CATALYST

[75] Inventor: Hanns-Jorg Liedloff, Domat-Ems, Switzerland

[73] Assignee: EMS-Inventa A.G., Zurich, Switzerland

[21] Appl. No.: 829,470

[22] Filed: Feb. 13, 1986

Related U.S. Application Data

[63] Continuation of Ser. No. 636,147, Jul. 31, 1984, abandoned.

[30] Foreign Application Priority Data

Aug. 4, 1983 [CH] Switzerland ............... 4228/83

[51] Int. Cl.$^4$ .................. C08L 67/00; C08L 77/00
[52] U.S. Cl. .................................. 528/283; 525/420; 528/279; 528/288; 528/301
[58] Field of Search ............... 528/288, 283, 279, 301; 525/420

[56] References Cited

U.S. PATENT DOCUMENTS

| | | | |
|---|---|---|---|
| 3,055,869 | 9/1962 | Wilson et al. | 528/283 |
| 3,057,824 | 10/1962 | Le Bras et al. | 528/283 |
| 3,162,616 | 12/1964 | Dombrow et al. | 528/283 |
| 3,194,791 | 7/1965 | Wilson et al. | 528/283 |
| 3,546,178 | 12/1970 | Caldwell et al. | 528/283 |
| 3,716,523 | 2/1973 | Cook | 528/283 |
| 4,565,849 | 1/1986 | Horikawa et al. | 528/288 |

Primary Examiner—Harold D. Anderson
Attorney, Agent, or Firm—Jordan B. Bierman

[57] ABSTRACT

A process for the manufacture of thermoplastic block polyetheresteramides by polycondensation of linear polyamides having carboxyl end groups with approximately equimolar quantitites of $\alpha,107$ -dihydroxypolyethers in the presence of organic or inorganic stannous compounds as esterification catalysts. Preferred polyamide-forming materials include the monomers of PA-6, PA-11, PA-12, PA-6.6, PA-6.9, PA-6.10, PA-6.12, PA-6.13, or mixtures thereof and linear and branched aliphatic, aromatic, and cycloaliphatic dicarboxylic acids. The molecular weight of the polyamides used is 700–15,000, and that of the dihydroxypolyethers is 400–4,000. Polycondensation takes place at atmospheric or reduced pressure and at temperatures of 210°–280° C.

16 Claims, No Drawings

PREPARATION OF BLOCK POLYETHERESTER AMIDE FROM CARBOXY TERMINATED POLYAMIDE AND DIHYDROXY POLYETHER WITH TIN COMPOUND CATALYST

This application is a continuation of application Ser. No. 636,147, filed 07/31/83, now abandoned.

This Application claims priority of Swiss Application 4428/83-0, filed Aug. 4, 1983.

Because of their excellent mechanical properties and processability thermoplastic block polyetheresteramides have become of steadily increasing importance in the manufacture of injection and rotation molded parts, extruded articles, fibers, and films.

Numerous processes are described for the manufacture of these block polyetheresteramides (also known as polyetheresteramide-block copolymers) by polycondensation of polyamideoligomers with carboxyl end groups and polyethers. Moreover, very good results, i.e., high viscosities in relatively short polycondensation times, are obtained when the polycondensation is carried out in the presence of an esterification catalyst. Processes based on this procedure are the subject of the German DOS No. 25 23 991 and DOS No. 28 37 687.

In these processes, titanium, zirconium and hafnium tetraalkoxides, and complex compounds based on them, are used as esterification catalysts. Despite catalytic effectiveness, all of these compounds have the disadvantage that, during the polycondensation of block polyetheresteramides clearly visible, solid particles, which are difficult to dissolve, are left in the polymer melt. Such residues embedded in the block polyetheresteramides interfere with their mechanical properties and impair their appearance. Above all, as a result of the presence of such solid substances, the strength of polyetheresteramide articles—e.g., tubes, films, fibers and monofilaments—is locally reduced.

The object of the present invention is to provide a process for the manufacture of block polyetheresteramides utilizing esterification catalysts which are free of the above disadvantage.

It is also an object of the present invention to provide polyetheresteramide manufacturing processes utilizing catalysts having high catalytic activity so as to maintain short polycondensation periods.

These goals are achieved by obtaining the block polyetheresteramides via the polycondensation of
(a) a linear polyamide having carboxyl end groups and having a molecular weight of from about 700 to about 15,000 with
(b) approximately equimolar quantities of an $\alpha,\omega$-dihydroxypolyether having a molecular weight of 400–4000 in the presence of an esterification catalyst in an amount of about 0.01 to about 5 percent by weight, based on the total weight of components (a) and (b). The reaction is carried out under pressures ranging from a high vacuum (about 0.1 mbar) to atmospheric pressure and at a temperature of 210°–280° C. The catalysts are organic or inorganic stannous compounds.

The preferable known polyamides having the carboxyl end groups are obtained by reacting the monomers of polyamide-6, polyamide-11, polyamide-12, polyamide-6.6, polyamide-6.9, polyamide-6.10, polyamide-6.12, polyamide-6.13, or mixtures thereof with a linear or branched aliphatic dicarboxylic acids having 4–13 carbon atoms, or an aromatic or cycloaliphatic dicarboxylic acid containing at least 8 carbon atoms.

Preferred $\alpha,\omega$-dihydroxypolyethers are polyether diols or copolyether diols having a molecular weight of 500–3000. The oxygen atoms of these dihydroxypolyethers are preferably separated from each other by at least 2 carbon atoms of a branched chain or by linear chains having 2–4 carbon atoms.

The inorganic and organic stannous compounds are advantageously selected from the group consisting of (i) chalcogenides, halides, salts of inorganic acids and complex compounds, (ii) salts of mono- and multifunctional, aliphatic, cycloaliphatic, and aromatic carboxylic acids, or (iii) salts of polyamides having the carboxyl end groups.

The known polyamides having carboxyl end groups are manufactured according to known processes, the particulars of which are dependent upon the specific polyamide. The defined molecular weight range of these polyamides include polyamide chains from 2 or 3 monomer units up to about 130 monomer units.

A typical process for the manufacture of the polyamides is the polycondensation of the suitable monomers and dicarboxylic acids at normal pressure or—in the case of caprolactam and particularly laurin lactam—the hydrolytic polymerization of the monomer in the presence of a dicarboxylic acid at temperatures of 200°–320° C. and at a pressure of 2–30 bar.

The polycondensation of the block polyetheresteramides can be carried out in various ways which differ in the sequence of the addition of the other components. When inorganic stannous compounds or stannous salts of the polyamides having carboxyl end groups are the esterification catalysts, the catalysts are advantageously dissolved in a melt of the polyamides prior to adding the $\alpha,\omega$-dihydroxypolyethers. If organic stannous compounds are used—for example, stannous dibenzoate, distearated or dodecanedioate—one may add the catalysts to the polyamides before, after, or together with the $\alpha,\omega$-dihydroxypolyethers. The organic stannous catalysts can also be added after the start of the polycondensation reaction without concern.

The formation of the block polyetheresteramides via polycondensation takes place very quickly due to the excellent solubility and catalytic efficiency of the stannous esterification catalysts of the invention. At atmospheric pressure, a high degree of polymerization is attained, which can be raised further by reducing the pressure to about 0.1 mbar. The polycondensation temperature is 210°–280° C., preferably 230°–270° C. The polycondensation reaction times of the present invention are comparable to those obtained with the most effective esterification catalysts previously known.

It is also possible to polycondense the block polyetheresteramides under atmospheric pressure or at higher viscosities by a subsequent solid phase condensation under high vacuum and at temperatures somewhat below the crystalline melting temperature of the polyamide blocks. The higher the reaction temperature and the melt temperature of the block polyetheresteramides, the faster the solid phase condensation reaction. Appropriate selection of components (a) and (b) can meet these conditions.

The block polyetheresteramides obtained by the process of the invention are substantially improved over previously obtained polyetheresteramides because, unlike the prior art substances, the products of the invention do not contain any difficult-to-dissolve solid residues originating from the catalyst. The appearance and the mechanical strength of the items manufactured from the polyetheresteramides resulting from our invention are in no way impaired, as in the case of products obtained from previously known processes and catalysts.

Block polyetheresteramides produced pursuant to the present process can also contain the usual additives such as antioxidants, light and heat stabilizers, flame retardants, dyes and plasticizers, which can be added before or during the polycondensation.

The following examples illustrated, but do not limit, the invention. The solution viscosities indicated were measured according to DIN 53 727 with 0.5% solutions of the block polyetheresteramides in m-cresol at 25° C.

EXAMPLE 1

278.8 g of a polyamide 12, having carboxyl end groups and a mean molecular weight of 923, produced from (a) laurinlactam or $\omega$-aminolauric acid and (b) dodecanedioic acid, is placed in a 1-liter autoclave with 0.22 g stannous oxide at 250° C. under inert gas atmosphere ($N_2$) and constant agitation. The oxide dissolves completely in the polymer melt within approximately 3 minutes. Dissolution is confirmed by the disappearance of the black SnO crystals.

After the SnO is dissolved in the polyamide melt, 297.8 g of polytetrahydrofuran having an average molecular weight of 990 is added. The mixture is agitated for 30 minutes at 250° C. under inert gas ($N_2$). Polycondensation begins during the agitation an about 9 g of reaction water are distilled off. Subsequently, the internal pressure of the autoclave is reduced to 15 Torr and maintained for 60 minutes; the temperature is kept at 250° C. Then, to complete the polycondensation, the pressure is further reduced to 0.1 Torr and held there for 110 minutes. The autoclave is then flushed with $N_2$, and the block polyetheresteramide formed is pressed out as a strand and granulated. The granulate shows no inclusions of solid particles. Its relative viscosity is 1.847 and its carboxyl number is 46 meg/kg (milli equivalents per kilogram).

EXAMPLE 2

This example differs from Example 1 in the kind and quality of the catalyst used, as well as in the length of the polycondensation phase at hgh vacuum.

In place of 0.22 g of SnO, 0.6 g of stannous dibenzoate is used as the catalyst. This catalyst was obtained by a reaction of SnO and somewhat above stoichiometric quantities of benzoic acid.

The procedure of Example 1 is followed except that, after 30 minutes reaction time at 0.1 Torr, a block polyetheresteramide is obtained that is completely free of enclosed solid particles. Its relative viscosity is 1.739 and its carboxyl number is 59 meg/kg.

EXAMPLE 3

170.5 g of polyamide 11 having carboxyl end groups, and a mean molecular weight of (produced from $\omega$-aminoundecanoic acid and azelaic acid according to known processes), is placed in a 1-liter autoclave with 0.13 g of stannous oxide under an inert gas atmosphere ($N_2$) with agitation. After dissolution of the SnO in the polyamide melt, 130 g of polytetrahydrofuran, having an average molecular weight of 990, is added. The mixture is agitated for 30 minutes at 250° C. under inert gas ($N_2$), during which polycondensation begins; about 4 g of reaction water is distilled off. The internal pressure of the autoclave is reduced to 15 Torr for 20 minutes while maintaining a reaction temperature of 260°. The pressure is then further reduced to 0.3 Torr for 40 minutes. Subsequently, the autoclave is ventilated with $N_2$, and the formed block polyetheresteramide is pressed out as a strand and granulated.

The granulate is completely free of enclosed solid particles. Its relative viscosity is 1.752 and its carboxyl number is 47 meg/kg.

EXAMPLE 4

214.5 g of polyamide 6, having carboxyl end groups and a mean molecular weight of 2160 (produced from caprolactame and adipic acid in a known manner), is placed in a 1-liter autoclave with 59.5 g of $\alpha,\omega$-dihydroxypolyethylene oxide having an average molecular weight of 600 and 0.3 g of stannous dibenzoate at 260° C., under nitrogen with agitation.

After homogenization of the mixture, the complete dissolution of the stannous benzoate, and the distilling off of about 2.5 g of reaction water, the internal pressure of the autoclave is reduced to 15 Torr and held there for 50 minutes. The temperature is maintained at 260° C. The pressure is then further reduced at the same temperature, to 0.8 Torr for 45 minutes. Subsequently, the block polyetheresteramide is pressed out and granulated.

The granulate has no enclosed solid particles. Its relative viscosity is 1.787 and its carboxyl number is 24 meg/kg.

COMPARISON EXAMPLE A

The same block polyetheresteramide as in Examples 1 and 2 is produced with the same starting material quantities except that 0.6 g of Zr ($OC_3H_7$)$_4$ (zirconium tetrapropylate) is used as an esterification catalyst. Also, the catalyst is introduced only after the polytetrahydrofuran has been added to the polyamide having carboxyl end groups.

The polycondensation is carried out at 250° C. under a $N_2$ atmosphere for 30 minutes at atmospheric pressure, a further 60 minutes at 15 Torr, and a still further 30 minutes at 0.1 Torr. The block polyetheresteramide formed is subsequently granulated.

The granulate exhibits clearly visible inclusions of a white solid substance. Its viscosity is 1.725 and it has a carboxyl number of 49 meg/kg.

COMPARISON EXAMPLE B

The block polyetheresteramide of the preceding Example is produced using Ti($OC_4H_9$)$_4$ (titanium tetrabutylate) as an esterification catalyst. Components (a) and (b) are used in he same amounts as in Examples 1 and 2. The polycondensation conditions and the sequence of adding the components (a) and (b) and the catalyst correspond to Comparison Example A; however, the polycondensation time at 0.1 Torr (high vacuum) is 190 minutes.

The block polyetheresteramide obtained contains an enclosed white solid substance, as did the product of Comparison Example A. Its relative viscosity is 1.672 and its carboxyl number is 60 meg/kg.

COMPARISON EXAMPLE C

The block polyetheresteramide of Example 3 is produced using 0.13 g of zirconium tetrapropylate as an esterification catalyst. The reaction conditions otherwise correspond to those of example 3.

A block polyetheresteramide is obtained that contains clearly visible inclusions of white solid substance. The relative viscosity of this polymer is 1.667 and the carboxyl number is 51 meg/kg.

COMPARISON EXAMPLE D

The block polyetheresteramide of Example 4 is produced using 0.3 g zirconium tetrapropylate as the esterification catalyst.

A block polyetheresteramide is obtained which contains visible inclusions of a white solid substance. The relative viscosity of this polymer is 1.722 and its carboxyl number is 33 meg/kg.

What we claim is:

1. A process for the manufacture of thermoplastic block polyetheresteramide comprising polycondensing
   (a) at least one linear polyamide having carboxyl end groups, said polyamide having a molecular weight of 700–15,000, with
   (b) approximately equimolar quantities of $\alpha,\omega$-dihydroxypolyether having a molecular weight of from 400 to 4,000
   in the presence of 0.01–5% by weight, relative to the total weight of (a) and (b), of an esterification catalyst selected from organic or inorganic stannous compounds, said polycondensing being conducted at a pressure between atmospheric pressure and high vacuum, and at temperature of about 210° to about 280° C.

2. The process of claim 1 wherein said polyamide having carboxyl groups is obtained by reacting the monomers of a polyamide selected from polyamide-6, polyamide-11, polyamide-12, polyamide-6.6, polyamide-6.9, polyamide-6.10, polyamide-6.12, polyamide-6.13, or mixtures thereof with at least one acid selected from linear or branched aliphatic dicarboxylic acids having 4–13 carbon atoms or aromatic or cycloaliphatic dicarboxylic acids containing at least 8 carbon atoms.

3. The process of claim 1 wherein said $\alpha,\omega$-dihydroxypolyether is selected from polyether diols or copolyether diols having a molecular weight of from 500 to 3,000, and wherein the oxygen atoms are separated from each other by at least 2 carbon atoms in a branched chain or by a linear chain of 2–4 carbon atoms.

4. The process of claim 1 wherein said inorganic stannous compounds are selected from the group consisting of chalcogenides, halides, salts of inorganic acids and complex compounds.

5. The process of claim 1 wherein said organic stannous compounds are selected from the group consisting of stannous salts of mono- and multifunctional aliphatic, cycloaliphatic, and aromatic carboxylic acids.

6. The process of claim 1 wherein said esterification catalyst is selected from stannous salts of polyamides having carboxyl end groups.

7. The process of claim 2 wherein said inorganic stannous compounds are selected from the group consisting of chalcogenides, halides, salts of inorganic acids and complex compounds.

8. The process of claim 3 wherein said inorganic stannous compounds are selected from the group consisting of chalcogenides, halides, salts of inorganic acids and complex compounds.

9. The process of claim 2 wherein said organic stannous compounds are selected from the group consisting of stannous salts of mono- and multifunctional aliphatic, cycloaliphatic, and aromatic carboxylic acids.

10. The process of claim 3 wherein said organic stannous compounds are selected from the group consisting of stannous salts of mono- and multifunctional aliphatic, cycloaliphatic, and aromatic carboxylic acids.

11. The process of claim 2 wherein said esterification catalyst is selected from stannous salts of polyamides having carboxyl end groups.

12. The process of claim 3 wherein said esterification catalyst is selected from stannous salts of polyamides having carboxyl end groups.

13. The process of claim 1 wherein said temperature is 230°–270° C.

14. The process of claim 1 wherein said pressure is from 0.1 mbar to 1 atmosphere.

15. The process of claim 1 wherein said catalyst is mixed with said component (a) prior to the addition of said component (b).

16. The process of claim 1 wherein said catalyst is an organic stannous compound and is added to a mixture of said components (a) and (b).

* * * * *